United States Patent Office 3,259,612
Patented July 5, 1966

3,259,612
POLYMERS HAVING A HIGHLY REGULAR STRUCTURE, OBTAINED FROM ESTERS CONTAINING AN INNER DOUBLE BOND AND PROCESS FOR PREPARING THE SAME
Giulio Natta, Mario Peraldo, and Mario Farina, Milan, Italy, assignors to Montecatini Societa Generale per l'Industria Mineraria e Chimica, Milan, Italy
Filed Feb. 1, 1961, Ser. No. 86,399
Claims priority, application Italy, Feb. 4, 1960, 1,980/60
8 Claims. (Cl. 260—89.3)

The present invention relates to polymers, having a highly regular structure, of unsaturated esters containing an inner double bond and to a process for preparing the same.

In our copending patent application, Serial No. 859,041 has been described the synthesis of polymers having a highly regular structure, obtained from monomers having the general formula $$R^{I}R^{II}C=CH^{III}R^{IV}$$

which monomers can have two isomeric forms, trans and cis, and, by polymerization, yield monomeric units which contain in the main chain two tertiary carbon atoms and can therefore exist in diastereoisomeric forms.

In said patent application have been reported as examples of polymers of the aforementioned type, those deriving from monomers such as DHC=CHR, and more particular DHC=CH—CH$_3$, α-deutero-β-methyl ethylene.

From the cis and trans forms of the monomer, two different polymers had been prepared in which the monomeric units (having the same structure in each of the two products) are diastereoisomers of those contained in the polymer obtained from the other stereoisomer of the monomer. Since the isotactic enchainment of the substituent —CH$_3$ has been recognized by physical means, the two polymers were found to be isotactic at both chain carbon atoms. They were therefore called diisotactic polymers and the prefix erithro- or threo was used, depending on the configuration of the monomeric unit, in order to distinguish one form from the other. According to Newman, "Steric effects in organic chemistry," N.Y., 1956, page 10, "erithro" is a diasteroisomer, which when observed in the Newman projection in one of the eclipsed forms, presents overlapping on at least two series of equal or similar substituents, while the opposite isomer is defined threo.

Said patent application also disclosed other polymers of monomers having a non-terminal double bond. These polymers have been obtained from compounds of the type R—CH=CH—OR' where R and R' are aliphatic, alicyclic or aromatic groups, e.g., methyl-isobutoxy ethylene (isobutylpropenyl ether). From the trans isomer of said monomers, crystalline polymers having a threodiisotactic structure have been obtained.

Homopolymers of unsaturated esters containing an inner double bond (or to put it in an alternative manner, a non terminal double bond) could however not be obtained until now.

It has now been surprisingly found that when unsaturated esters, containing an inner double bond in a chain of at least four carbon atoms, are polymerized in the presence of particular catalytic systems, homopolymers are obtained which possess a highly regular structure and a high crystallinity, as shown by X-ray examination.

An object of the present invention is therefore to provide polymers of unsaturated esters which possess a highly regular structure and are crystalline, as shown by X-ray examination, wherein the ester has the following general formula:

$$R—CH=CH—COO—R' \qquad (1)$$

wherein R is an aliphatic or aromatic radical and R' is an aliphatic radical.

By polymers having a highly regular sterical structure, there are intended polymers having side substituents which have sterical configurations repeating regularly along the main chain for sections which are long enough to impart crystallizability to said polymers.

A further object of the present invention is to provide a process for polymerizing the esters of the above general Formula 1.

This process is characterized by the fact that the polymerization is carried out at a temperature between +50° and —100° C. in the presence of stereospecific catalytic systems, containing organometallic compounds of highly electropositive metals having a reduced anionic activity in respect to the Ziegler type catalysts.

More particularly, it is preferable in order to obtain polymers having a high melting point, to use monomers in which R and R' are aromatic or aliphatic groups with symmetrical branches. Thus, R' can be isopropyl, tertiary butyl groups, etc.; while R can be methyl or phenyl groups.

Examples of some monomers of general Formula 1 are: methyl, isopropyl and tertiary butyl crotonate, and methyl isopropyl and tertiary butyl cinnamate etc. These compounds give two stereoisomers each having a very different stability. By employing the normal methods of synthesizing isomers, the trans isomers having a sufficient sterical purity in order to polymerize according to the present invention, are obtained.

The isomeric monomers should therefore be carefully purified, before the polymerization, by distillation over drying agents such as BaO, P$_2$O$_5$-, etc.

As polymerization catalysts, compounds containing both halogen atoms and an organic carbon-to-metal bond are used.

Some examples of these catalysts are the organometallic halides of metals belonging to the 2nd group of the Periodic Table according to Mendeleijeff. Of these catalytic compounds, the derivatives of magnesium, beryllium, zinc and cadmium were found to be particularly useful in the process of the present invention.

Phenyl magnesium bromide, after being treated for a sufficiently long time at 150° C., under high vacuum in order to completely remove ether, is a particularly active catalyst for the process of the present invention.

The polymerization is preferably carried out in the presence of a solvent. Conventional polymerization solvents such as aliphatic or aromatic hydrocarbons (e.g., toluene) can be used in the process of the present invention.

The crystalline polymers thus obtained are soluble in benzene, toluene, etc. The polymers, in general, are precipitated from methanol or acetone and are also insoluble in methyl-ethyl ketone and ethyl acetate.

These polymers can be saponified according to known methods thus obtaining polyacids or polysalts having a sterically ordered structure.

The crystalline polymers of this invention, e.g., crystalline poly-isopropyl cinnamate, poly-isopropyl crotonate and poly-tertiary butylcrotonate are high melting point white powders (melting point higher than 250° C.), and due to this property the polymers of this invention can be used as high melting point thermoplastic materials. Since these polymers possess a high molecular weight they can be extruded into filaments, oriented by stretching, and then used as textile fibres.

Depending on such factors as the stereospecificity of the catalyst, the monomer's structure and the steric purity and the melting point of the polymer, the polymers obtained are accompanied by greater or lesser amounts of rubbery or vitreous amorphous products and low molecular weights oily polymers.

It has in general been observed that when operating at higher temperatures the amount of low molecular weight polymers increases while the amount of crystallizable polymers decreases.

The separation of the amorphous polymer from the crystalline polymer can be carried out by means of conventional selective solvents.

The following examples are given to illustrate the present invention and are not to be considered as a limitation thereof.

*Example 1*

4.9 g. of tertiary butyl crotonate, after distillation over BaO (Boiling Point=154–156° C., $n_D^{20}$=1.4268), are dissolved in 15 cc. of toluene, and are added to a suspension of 0.5 g. of ether-free phenyl magnesium bromide in 15 cc. of toluene, while maintaining the temperature at −78° C.

This mixture is agitated at said temperature for 20 hours. The resulting composition is then heated to room temperature, washed with hydrochloric acid and then with water. The aqueous phase is separated and the polymer is precipitated with methanol. After drying, a polymer consisting of 4.2 g. of a white powder is obtained.

By evaporation of the solvents 0.3 g. of oils is recovered. Upon X-ray examination, the polymer is demonstrated to be crystalline. The instrinsic viscosity (in toluene at 30° C.) is 0.1 x 100 cc./g. The softening point of the polymer is higher than 280° C.

*Example 2*

3.0 g. of isopropyl crotonate, after distillation over BaO (Boiling Point=145–147° C., $n_D^{20}$=1.4219), are polymerized in the manner described in Example 1, using 0.5 g. of phenyl magnesium bromide in 30 cc. of toluene maintained at −78° C. for 20 hrs. After similar washing and precipitation, 2.2 g. of a solid polymer (white powder) are obtained. After annealing at 165° C., this polymer is demonstrated to be crystalline under X-ray examination. Said polymer possesses an instrinsic viscosity (determined in tetrahydronaphthalene at 135° C.) of 0.3 x 100 cc./g. The softening point of the polymer is about 270° C.

*Example 3*

3.3 g. of isopropyl cinnamate, after distillation over BaO (Boiling Point=158°–160° C., under a pressure of 16 mm. Hg, $n_D^{20}$=1.5452), is polymerized in the manner described in Example 1, using 0.5 g. of phenyl magnesium bromide in 30 cc. of toluene maintained at a temperature between +15° and +20° C. for 24 hours.

After washing and precipitation, 0.04 g. of polymer, which is demonstrated to be crystalline under X-ray examination and has a softening point of about 290° C., is obtained.

Many variations can of course be made without departing from the spirit of the present invention.

Figure 1:
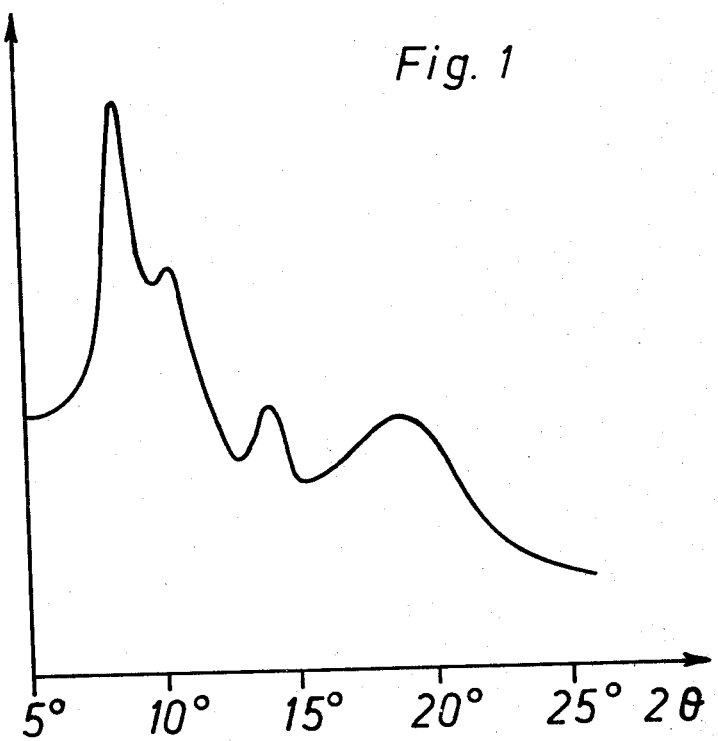
FIGURE 1 represents the X-ray spectrum (CuKα), registered with a Geiger counter, of poly-tertiary butyl crotonate in the form of a powder, for values of angle 2θ between 5° and 25°.
Figure 2:
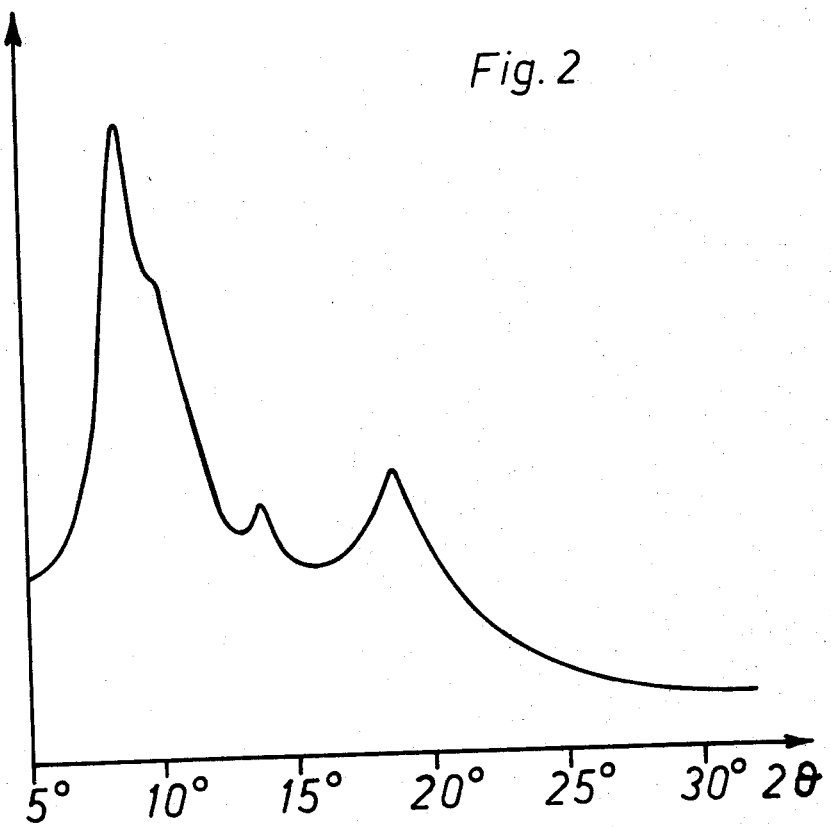
FIGURE 2 represents the X-ray spectrum of poly-isopropyl crotonate for value of angle 2θ between 5° and 30°. (In the ordinate there is given the relative intensities.)

Having thus described the present invention, what it is desired to secure and claim by Letters Patent is:

1. Crystalline homopolymers selected from the group consisting of (1) polytertiary butyl crotonate having the X-ray diffraction pattern shown in FIG. 1 and (2) poly-isopropyl crotonate having the X-ray diffraction pattern shown in FIG. 2.

2. A crystalline homopolymer of tertiary butyl crotonate, said homopolymer having the X-ray diffraction pattern shown in FIG. 1.

3. A crystalline homopolymer of ispropyl crotonate, said homopolymer having the X-ray diffraction pattern shown in FIG. 2.

4. A method of producing a crystalline homopolymer, this method comprising polymerizing a monomer selected from the group consisting of tertiary butyl crotonate and isopropyl crotonate at a temperature of from about −100 to +50° C. in the presence of phenyl magnesium bromide, said crystalline homopolymer having the X-ray diffraction pattern shown in FIG. 1 when said monomer is tertiary butyl crotonate, said crystalline homopolymer having the X-ray diffraction pattern shown in FIG. 2 when the monomer is isopropyl crotonate.

5. A thermoplastic material obtained from the homopolymer of claim 1.

6. Textile fibre obtained from the homopolymer of claim 1.

7. Process according to claim 4, wherein an aromatic hydrocarbon is used as a solvent.

8. Process according to claim 7, wherein toluene is used as the solvent.

References Cited by the Examiner

UNITED STATES PATENTS

| | | | |
|---|---|---|---|
| 2,318,959 | 5/1954 | Muskat et al. | 260—89.3 |
| 2,612,475 | 9/1952 | Bartlett | 260—89.3 |
| 2,841,574 | 7/1958 | Foster | 260—89.3 |
| 3,103,503 | 9/1963 | Fox et al. | 260—89.5 |

OTHER REFERENCES

Marvel et al.: J. Am. Chem. Soc., vol 75 (1953), pages 3272–3.

Petro et al.: Chem. Abs., vol. 45 (1951), pages 7051g.

Gaylord et al.: Linear and Steroregular Addition Polymers, Interscience Publishers, Inc., N.Y. (1959), page 519, paragraph 4.

Miller (2) et al: J. Pol. Science., vol. 55 (1961), pgs. 643–656.

Landler: Recueil des Travaux Chim ques des Pays-Bas, vol. 68, pages 992–998 (1949).

Garrett et al.: Journ. Amer. Chem. Soc., vol. 81, pgs. 1007–1008 (1959).

Miller et al.: Chemistry and Industry, Oct. 11, 1958, pages 1323–1324, TP 1S63.

JOSEPH L. SCHOFER, *Primary Examiner.*

HAROLD BURSTEIN, DONALD E. CZAJA,
*Examiners*

J. R. LIBERMAN, H. WONG, N. G. TORCHIN,
*Assistant Examiners.*